United States Patent [19]

Kokuryo

[11] Patent Number: 4,793,791

[45] Date of Patent: Dec. 27, 1988

[54] ROTARY POWDER COMPRESSION MOLDING APPARATUS

[75] Inventor: Hiroshi Kokuryo, Osaka, Japan

[73] Assignee: Hata Iron Works, Ltd., Japan

[21] Appl. No.: 35,398

[22] Filed: Apr. 6, 1987

[30] Foreign Application Priority Data

Apr. 8, 1986 [JP] Japan ................................ 61-80455

[51] Int. Cl.4 ............................................ B29C 43/08

[52] U.S. Cl. ................................ 425/345; 425/348 R; 425/351

[58] Field of Search ............... 425/225, 345, 344, 408; 425/345, 348, 351, 353, 354, 225, 344, 408, 218

[56] References Cited

U.S. PATENT DOCUMENTS 3,230,905 1/1966 Gajda ................................ 425/345
3,332,367 7/1967 Sperry et al. .
3,533,360 10/1970 Kibbe ................................ 425/345
3,999,922 12/1976 Shimada ............................ 425/345
4,259,049 3/1981 Willich ............................... 425/353
4,403,935 9/1983 Crossley et al. .................... 425/225

*Primary Examiner*—Willard Hoag
*Attorney, Agent, or Firm*—Brown, Martin, Haller & Meador

[57] ABSTRACT

A rotary powder compression molding apparatus is disclosed, which includes a rotary disk. The rotary disk has a mortar mounting portion, an upper pestle guide portion arranged above the mortar mounting portion, and a lower pestle guide portion arranged below the mortar mounting portion. An annular vertical wall, extending upward, is arranged on the periphery of the lower pestle guide portion, and a recessed powder trap portion is formed inside the vertical wall. Powder leaking from mortars is moved outwardly due to a centrifugal force, and is trapped by the powder trap portion.

3 Claims, 1 Drawing Sheet

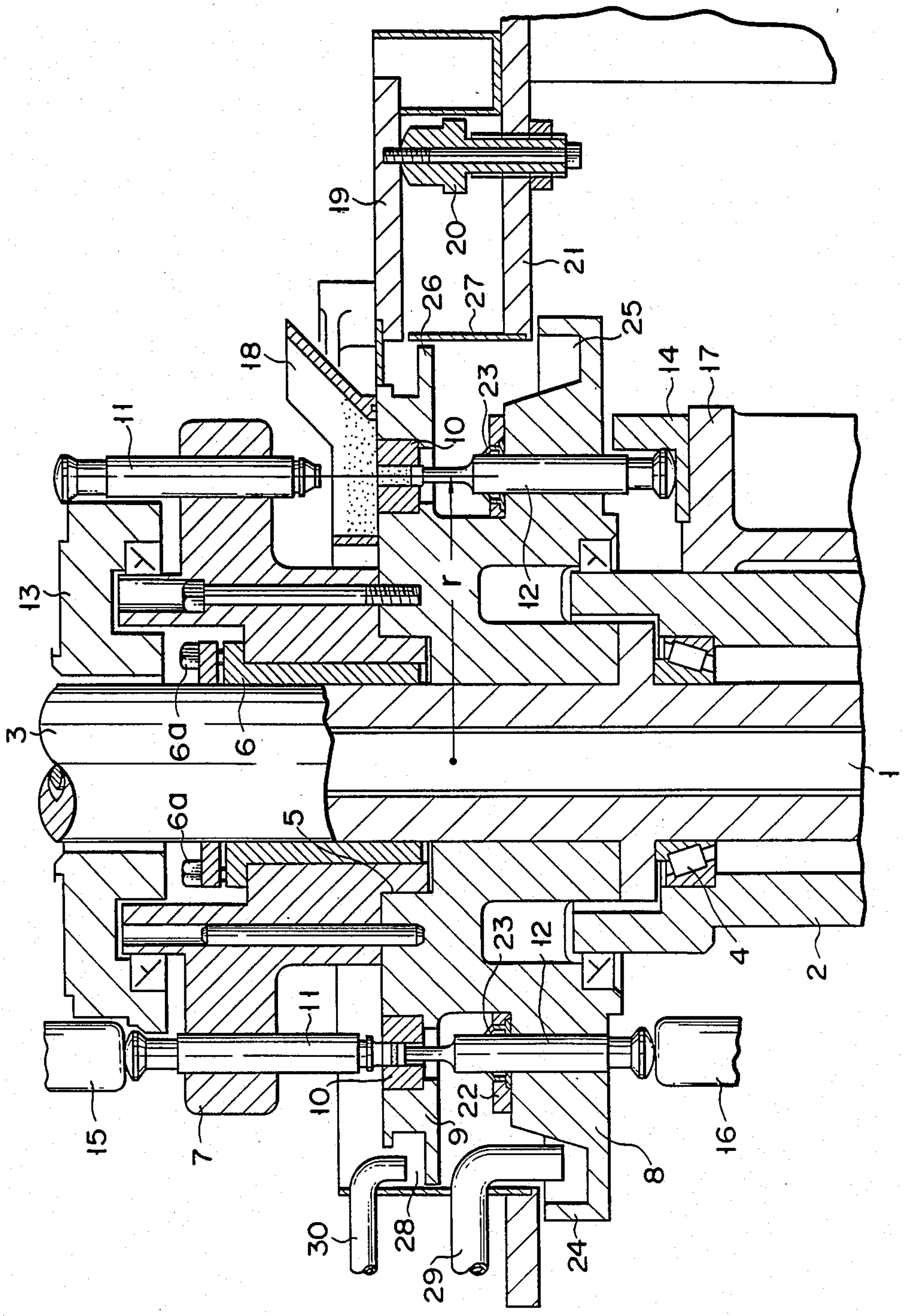
19
20
21
26
27
25
18
23
10
14
17
11
13
12
r
3
6a
6
1
5
4
2
23
12
11
10
22
9
7
15
16
8
30
28
29
24

ROTARY POWDER COMPRESSION MOLDING APPARATUS

BACKGROUND OF THE INVENTION

1. Field of the Invention

The present invention relates to a rotary powder compression molding apparatus for compressing powder to produce pills and the like. More specifically, the apparatus of the present invention comprises a rotary disk which is rotated, and a mortar mounting portion is formed on the rotary disk. A plurality of powder compression mortars are formed on the mortar mounting portion and aligned in the circumferential direction of the disk. Upper and lower pestle guide portions are formed respectively on the upper and lower portions of the mortar mounting portion, and upper and lower pestles are guided by the upper and lower pestle guide portions so as to be vertically slidable. In the apparatus according to the present invention, a powder receiving portion is formed on the outer peripheral portion of the lower pestle guide portion. Powder leaking from the mortar upon compression molding of the powder is trapped by the powder receiving portion, and can be prevented from being scattered to an outer atmosphere.

2. Prior Art

As a conventional apparatus for compression-molding medicine powder to produce pills, a rotary powder compression apparatus is popular. The apparatus of this type comprises a rotary disk which is horizontally arranged and is rotated. A plurality of mortars are arranged on the rotary disk and aligned in its circumferential direction. Upper and lower pestle guide portions are respectively formed on the upper and lower portions of the rotary disk. Upper and lower pestles are slidably guided by the upper and lower pestle guide portions along the vertical direction. Upon rotation of the rotary disk, medicine powder is supplied to each mortar, and the upper and lower pestles are driven by cam rails, driving rollers, and the like, so that these pestles are pushed into these mortars to compression-mold the powder into pills.

Upon compression of the powder, the powder leaks from each mortar, falls from the outer periphery of the disk due to the centrifugal force of the rotating rotary disk, and flies in air and scattered to the outer atmosphere. The scattered powder undesirably contaminates a room in which the power compression molding apparatus is installed. More particularly, if this powder is a medicine, this may be harmful to the health of an operator, or may be mixed with other types of medicines.

In order to eliminate the above drawbacks, in the conventional apparatus, a cover for surrounding the rotary disk is arranged to prevent powder from being scattered. An annular receiving groove portion is formed in the inner surface of the cover and located near the outer edge of the rotary disk, so that powder falling from the outer edge of the rotary disk is received and trapped by the receiving groove portion, and the powder cannot be scattered in this cover.

However, if the cover is arranged, the structure of the apparatus is complicated, and this cover must be removed upon maintenance or cleaning of the apparatus, resulting in cumbersome operations. In addition, powder may still leak from a joint of the cover.

SUMMARY OF THE INVENTION

It is a first object of the present invention to prevent powder scattering in the rotary compression molding apparatus described above.

It is a second object of the present invention to prevent powder scattering and facilitate maintenance and cleaning of the apparatus without arranging the cover described above.

In order to achieve the above objects of the present invention, a powder trap portion is formed on the periphery of the rotary disk. The powder trap portion is formed on the periphery of the lower pestle guide portion and inside a vertical wall standing vertically at a position outside the positions of mortars. The powder leaking from the mortars fall in and is trapped by the powder trap portion due to the centrifugal force.

According to a preferred embodiment of the present invention, a similar powder trap portion is formed on the periphery of the mortar mounting portion on which the mortars are arranged. A suction nozzle is inserted in the powder trap portion, and air is drawn by suction through the suction nozzle mounted on the stationary side of the apparatus, so that the powder trapped by the powder trap portion is drawn by the suction nozzle together with the air and is removed.

BRIEF DESCRIPTION OF THE DRAWING

The present invention will become more apparent from the following description of the embodiment taken in conjunction with the accompanying drawing. The drawing is a sectional view of the main part of an apparatus according to an embodiment of the present invention.

DETAILED DESCRIPTION OF THE EMBODIMENT

An embodiment of the present invention will now be described with reference to the drawing. The drawing shows the section of a rotary disk portion of the rotary powder compression molding apparatus. In the drawing, reference numeral 1 denotes a stationary shaft which vertically extends through a lower frame 2 of the apparatus. Driving shaft 3 is vertically arranged to surround stationary shaft 1. Driving shaft 3 is received by lower frame 2 through bearing 4, and can be rotated at a predetermined speed by a driving mechanism (not shown) arranged on lower frame 2.

Rotary disk 5 is arranged on driving shaft 3. Rotary disk 5 is horizontally mounted on shaft 3, and is rotated with driving shaft 3 in the horizontal plane. Rotary disk 5 is mounted on driving shaft 3 through connecting flange member 6 and bolts 6*a*. Rotary disk 5 can be radially divided into two sections in order to facilitate its mounting and removing operations. Rotary disk 5 comprises disk-like upper and lower pestle guide portions 7 and 8, and mortar mounting portion 9. Upper pestle guide portion 7 is arranged above mounting portion 9, and lower pestle guide portion 8 is arranged below portion 9.

A plurality of mortars 10 are arranged on mortar mounting portion 9. These mortars 10 are arranged along an identical circumference at equal angular intervals. Upper and lower pestles 11 and 12 are arranged above and below each mortar 10. Upper and lower pestles 11 and 12 are respectively guided by upper and lower pestle guide portions 7 and 8 and are vertically slidable. Dust-proof packing 23 is arranged on the sliding portion of each lower pestle 12, and is held by packing press plate 22. Thus, leaking powder can be prevented from entering the sliding portion of lower pestles 12.

Upper and lower pestle driving rails 13 and 14 are arranged on a stationary member of the apparatus. Upon rotation of disk 5, upper and lower pestles 11 and 12 are vertically driven by rails 13 and 14. Upper pestle 11 is reciprocated in the vertical direction between a position at which its distal end portion is completely drawn out from corresponding mortar 10 and is located thereabove and a position at which its distal end portion enters corresponding mortar 10. Lower pestle 12 is reciprocated while its distal end portion is inserted in corresponding mortar 10. Note that reference numeral 17 denotes a supporting member for supporting lower pestle driving rail 14.

Powder supplier 18 is arranged on the stationary member of the apparatus. Powder supplier 18 is in tight contact with the upper surface of mortar mounting portion 9 on rotary disk 5, and powder in supplier 18 is supplied to mortars 10. Supplier 18 is mounted on supporting plate 19. Supporting plate 19 is mounted through height adjusting mechanism 20 on partition plate 21 mounted on the stationary member of the apparatus. A circular hole is formed on partition plate 21, and the edge portion of the hole is closer to the periphery of lower pestle guide portion 8 on rotary disk 5. Upper and lower pestle press rollers 15 and 16 are arranged at positions for compression-molding powder in each mortar 10 by upper and lower pestles 11 and 12, instead of upper and lower pestle driving rails 13 and 14. At these positions, upper and lower pestles 11 and 12 respectively abut against press rollers 15 and 16 and are strongly pressed thereby, so as to compress powder in mortars 10 to mold pills.

The powder compression molding apparatus of this embodiment comprises a mechanism for trapping powder leaking from mortars 10. More specifically, annular vertical wall 24, which extends upward, is formed on the periphery of lower pestle guide portion 8 of rotary disk 5. The edge portion of the upper end of vertical wall 24 is adjacent to the lower surface of partition plate 21 to be separated by a small gap. First powder trap portion 25, defined by an annular groove portion, is formed on the inner surface of vertical wall 24. Powder trap portion 25 is formed outside the circumference hving radius r, along which mortars 10 are arranged. Therefore, powder, which leaks from mortars 10 and falls on the upper surface of lower pestle guide portion 8, is moved outwardly due to the centrifugal force, and is trapped by powder trap portion 25.

Annular sealing wall 27, extending upward, is formed on the inner periphery of partition plate 21. Sealing wall 27 extends to the upper portion of mortar mounting portion 9 of rotary disk 5. Flange-like projecting portion 26 projects outwardly from the lower peripheral portion of rotary disk 5, and the periphery of projecting portion 26 is adjacent to the inner surface of sealing wall 27 to be separated by a small gap. Projecting portion 26 and sealing wall 27 define second powder trap portion 28 of an annular groove, on the periphery of mortar mounting portion 9. Therefore, powder leaking from mortars 10 on the upper surface of mortar mounting portion 9 is moved outwardly by the centrifugal force, and is trapped by second powder trap portion 28.

A space extending from the opening of the upper surface of first powder trap portion 25 is surrounded by lower pestle guide portion 8, mortar mounting portion 9, and sealing wall 27. Therefore, powder falling from mortars 10 in this space will not be scattered to an outer atmosphere, and is perfectly trapped by first powder trap portion 25.

First and second suction nozzles 29 and 30 are arranged to extend through sealing wall 27. The distal end openings of suction nozzles 29 and 30 are adjacent to and opposite to the bottoms of powder trap portions 25 and 28. Suction nozzles 29 and 30 are connected to a suction mechanism (not shown). Therefore, powder stored in the bottom portions of powder trap portions 25 and 28 is drawn together with air by suction nozzles 29 and 30, and is removed therefrom. Since rotary disk 5 is kept rotated, powder stored in the entire bottom portions of annular powder trap portions 25 and 28 can be drawn by suction and removed.

In the powder compression molding apparatus of the present invention as described above, powder leaking from mortars is moved outwardly by the centrifugal force and is trapped by powder trap portions. Therefore, leaking powder can be prevented from being scattered. A cover for covering the entire rotary disk is not needed, the apparatus has a simple structure, and cleaning and maintenance of the apparatus can be facilitated.

The present invention is not limited to the above embodiment. For example, the second powder trap portion on the periphery of the mortar mounting portion on the rotary disk may be omitted. In this case, since powder leaking from mortars falls on the upper surface of the lower pestle guide portion, the powder can be trapped by the powder trap portion formed on the periphery of the lower pestle guide portion. In addition, the suction nozzles may be omitted. In this case, the powder trap portion can be periodically cleaned to remove the powder stored therein.

What is claimed is:

1. In a rotary powder compression molding apparatus, including a rotary disk rotated within a horizontal plane, said rotary disk being provided with a mortar mounting portion, an upper pestle guide portion arranged above said mortar mounting portion, and a lower pestle guide portion arranged below said mortar mounting portion, said mortar mounting portion being provided with a plurality of mortars arranged on an identical circumference of said mortar mounting portion, said upper pestle guide portion being adapted to guide a plurality of upper pestles, and said lower pestle guide portion being adapted to guide a plurality of lower pestles, wherein, the improvement comprises:

an annular vertical wall formed on a periphery of said lower pestle guide portion and extending upwardly therefrom, said annula vertical wall being disposed outside said circumference;

a first grooved powder trap portion formed inside said vertical wall and having a bottom; and a suction nozzle having a distal end opening adjacent said grooved powder trap portion bottom for drawing powder and air from said powder trap portion.

2. The improvement of claim 1, further including:

a second powder trap portion formed on a periphery of said mortar mounting portion; and a second suction nozzle having a distal end opening into said second powder trap portion for drawing air and powder from said second powder trap portion.

3. The improvement of claim 1, further including:

a upper edge portion of said annular vertical wall;

a sealing wall disposed adjacent to said upper edge portion and to a periphery of said mortar mounting portion; and a space extending from said first powder trap portion and enclosed by said mortar mounting portion, said lower pestle guide portion, and said ceiling wall.

* * * * *